(12) United States Patent
Terasaka et al.

(10) Patent No.: US 11,738,728 B2
(45) Date of Patent: Aug. 29, 2023

(54) ROAD SURFACE STEP DETERMINATION DEVICE FOR VEHICLES

(71) Applicant: ADVICS CO., LTD., Kariya (JP)

(72) Inventors: Masato Terasaka, Ichinomiya (JP); Chisa Kitahara, Nagoya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 17/274,244

(22) PCT Filed: Sep. 24, 2019

(86) PCT No.: PCT/JP2019/037286
§ 371 (c)(1),
(2) Date: Mar. 8, 2021

(87) PCT Pub. No.: WO2020/067018
PCT Pub. Date: Apr. 2, 2020

(65) Prior Publication Data
US 2021/0347344 A1 Nov. 11, 2021

(30) Foreign Application Priority Data
Sep. 26, 2018 (JP) .................. 2018-180193

(51) Int. Cl.
*B60T 8/1761* (2006.01)
*B60T 8/172* (2006.01)
*B60T 8/173* (2006.01)

(52) U.S. Cl.
CPC .......... *B60T 8/1761* (2013.01); *B60T 8/172* (2013.01); *B60T 8/173* (2013.01)

(58) Field of Classification Search
CPC .... B60T 2210/14; B60T 2220/04; B60T 8/00; B60T 8/172; B60T 8/173; B60T 8/1761
See application file for complete search history.

(56) References Cited

U.S. PATENT DOCUMENTS

2004/0098187 A1* 5/2004 Nakao ................ B60W 40/064
701/79
2005/0044944 A1* 3/2005 Kogure .................. B60T 8/172
73/146

(Continued)

FOREIGN PATENT DOCUMENTS

JP         2004224306 A     8/2004

OTHER PUBLICATIONS

International Search Report (PCT/ISA/210) with translation and Written Opinion (PCT/ISA/237) dated Nov. 12, 2019, by the Japanese Patent Office as the International Searching Authority for International Application No. PCT/JP2019/037286.

*Primary Examiner* — Jeff A Burke
*Assistant Examiner* — Zachary Joseph Wallace
(74) *Attorney, Agent, or Firm* — BUCHANAN INGERSOLL & ROONEY PC (57) ABSTRACT

A step determination device includes an operation amount sensor that detects an operation amount of a braking operation member, and a controller that determines a step by using the wheel speed and the operation amount. In the step determination device, the controller calculates an actual variable amount by using the wheel speed, calculates an estimated variable amount corresponding to the actual variable amount by using the operation amount, and executes the determination of the step by using the actual variable amount and the estimated variable amount. For example, the controller determines the presence of the step when the deviation between the actual variable amount and the estimated variable amount is not less than a predetermined value, and determines the absence of the step when the deviation is less than the predetermined value.

3 Claims, 4 Drawing Sheets

(56) References Cited

U.S. PATENT DOCUMENTS

| | | | | |
|---|---|---|---|---|
| 2009/0254250 A1* | 10/2009 | Koo | ............... | B60W 30/18145 |
| | | | | 701/37 |
| 2010/0191434 A1* | 7/2010 | Fujita | ................... | B60W 10/11 |
| | | | | 701/91 |
| 2014/0163770 A1* | 6/2014 | Wakao | ............... | B60W 40/068 |
| | | | | 701/1 |
| 2015/0203194 A1* | 7/2015 | Griffith | ................. | B60T 8/176 |
| | | | | 701/3 |
| 2018/0170368 A1* | 6/2018 | Fukuman | ............. | B60W 30/09 |
| 2019/0329786 A1* | 10/2019 | Kimura | .............. | B60W 40/107 |

\* cited by examiner

ROAD SURFACE STEP DETERMINATION DEVICE FOR VEHICLES

TECHNICAL FIELD

The present disclosure relates to a step determination device for a road surface on which a vehicle travels.

BACKGROUND ART

A vehicle brake control device in Patent Literature 1 has a pressure adjusting control means for executing the anti-lock brake control, where the braking fluid pressure is reduced, held, and increased. The pressure adjusting control means controls a pressure adjusting means. This device is designed to avoid deterioration of the driver's braking feeling on flat roads with high friction coefficient, and to prevent delays in pressure increase control when a wheel of the vehicle ascent a step on a road during braking. In the document, the differentiation means 21 differentiates the wheel acceleration or deceleration that the wheel acceleration or deceleration calculation means 20 have calculated. Then, a step ride-over determination means 22 determines the vehicle being in a step ride-over state according to the differential value of the wheel acceleration or deceleration being greater than or equal to a threshold value at the time of braking in the non-anti-lock brake control state.

The device in the document determines the presence or absence of a step in the vehicle traveling road surface on the basis that the differential value of the wheel deceleration. The wheel deceleration also changes by the driver's operation of the braking operation member. For example, the differential value of the wheel deceleration increases due to the sudden braking operation by the driver, and then the presence of the step in the road may be determined. Therefore, it is desired to further improve the accuracy in the road surface step determination.

CITATIONS LIST

Patent Literature

Patent Literature 1: Japanese Unexamined Patent Application Publication No. 2004-224306

SUMMARY

Technical Problems

An object of the present disclosure is to provide a device for determining the presence or absence of a road surface step, where the determination accuracy of which can be improved.

Solutions to Problems

A step determination device for a vehicle according to the present disclosure is configured to determine a presence or absence of a step in a traveling road surface of the vehicle by using a wheel speed (Vw) of the vehicle. The device includes an operation amount sensor (BA) configured to detect an operation amount (Ba) of a braking operation member (BP) of the vehicle and a controller (ECU) configured to determine the step by using the wheel speed (Vw) and the operation amount (Ba).

In the step determination device according to the present disclosure, the controller (ECU) is configured to calculate an actual variable amount (Da) by using the wheel speed (Vw), to calculate an estimated variable amount (De) corresponding to the actual variable amount (Da) by using the operation amount (Ba), and determine the presence of the step by using the actual variable amount (Da) and the estimated variable amount (De). For example, the controller (ECU) is configured to determine the presence of the step when a deviation (hD) between the actual variable amount (Da) and the estimated variable amount (De) is greater than or equal to a predetermined value (hx), and determines the absence of the step when the deviation (hD) is less than the predetermined value (hx).

The wheel deceleration dV changes not only due to the road surface step but may also due to the sudden braking operation. According to the above, the presence or absence of the road surface step is determined in consideration of the estimated variable amount De, which is a component of the wheel deceleration dV generated by the operation amount Ba of the braking operation member BP. Therefore, the determination accuracy of the road surface step is improved.

DESCRIPTION OF EMBODIMENT

Reference letters and numerals of configuring members, etc., and reference letters at the end of the Reference letters In the following description, configuring members, calculation processes, signals, characteristics, and values having the same reference letters and numerals such as "ECU" have the same functions. Reference letters at the end of the Reference letters, which "i" to "l", are related to wheels are comprehensive letters indicating which wheel they relate to. Specifically, "i" indicates a right front wheel, "j" indicates a left front wheel, "k" indicates a right rear wheel, and "l" indicates a left rear wheel. For example, a wheel cylinder CWi represents the right front wheel, a wheel cylinder CWj represents the left front wheel, a wheel cylinder CWk represents the right rear wheel, and a wheel cylinder CWl represents the left rear wheel. Furthermore, the reference letters "i" to "l" can be omitted. When the reference letters "i" to "l" are omitted, each the reference letters a generic name of each of the four wheels. For example, "WH" represents each wheel, and "CW" represents each wheel cylinder.

The reference numerals "1" and "2" added to the end of various reference letters of two braking systems are comprehensive reference letters indicating which of the two braking systems they relate to. Specifically, "1" indicates a first system and "2" indicates a second system. For example, in the two master cylinder fluid passages, they are described as a first master cylinder fluid passage HM1 and a second master cylinder fluid passage HM2. Furthermore, the reference numerals "1" and "2" at the end of the symbol can be omitted. When the reference numerals "1" and "2" are omitted, the reference letter represents a generic name of each of the two braking systems. For example, "HM" represents the master cylinder fluid passage of each braking system.

A portion of the fluid passage, which is close to the reservoir RV and away from the wheel cylinder CW, is referred an upper portion. Another portion of the fluid passage, which is away from the reservoir RV and close to the wheel cylinder CW, is referred a lower portion. The fluid passage is a path for moving the braking fluid BF which is the working liquid of the brake control device SC. The fluid passage corresponds to a brake piping, a fluid path of a fluid unit, a hose, and the like. The inside of each fluid passage is filled with the braking fluid BF.

{Braking Control Device SC Provided with a Road Surface Step Determination Device DH for the Vehicle According to the Present Disclosure}

Figure 1:
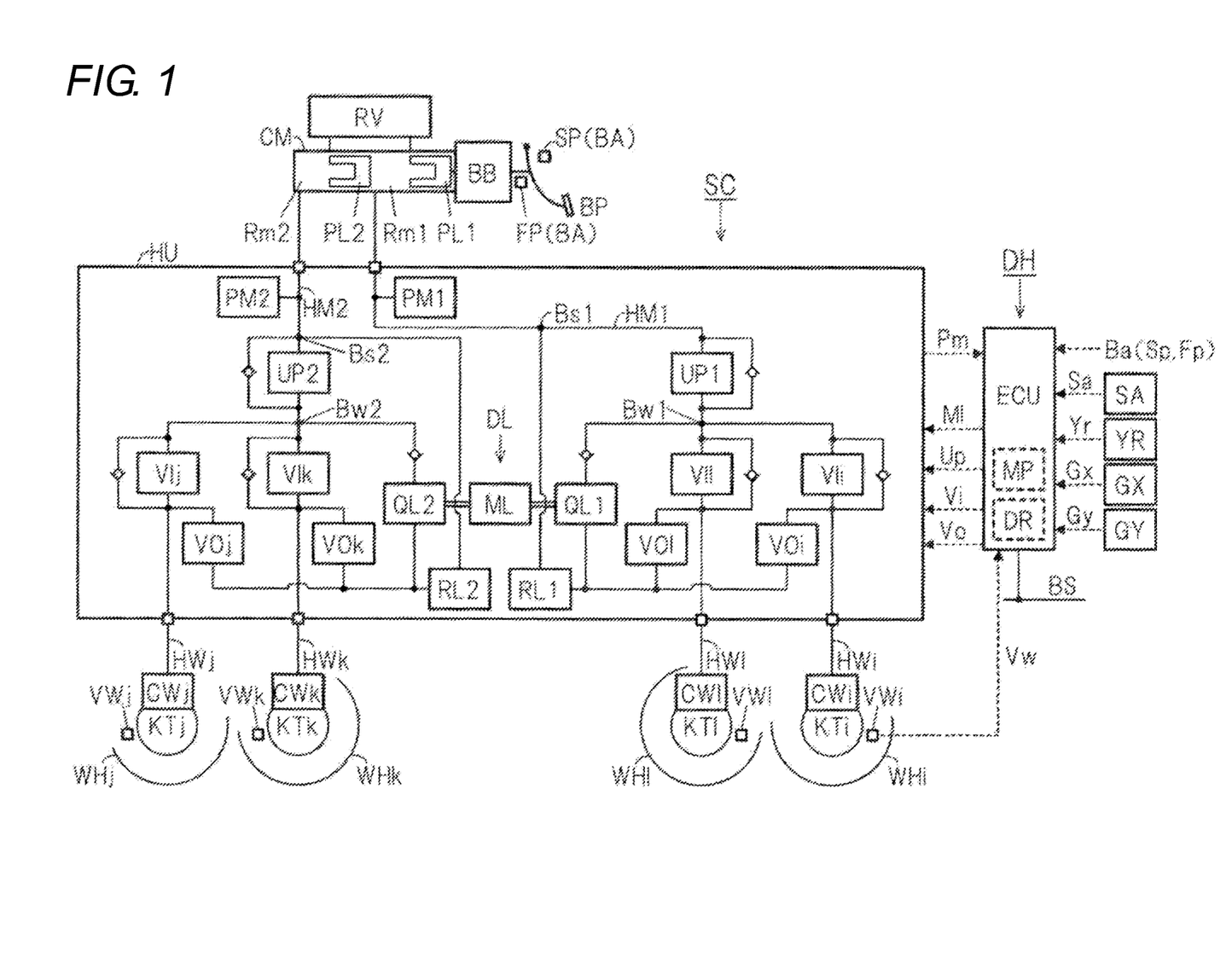
FIG. 1 is an overall configuration view for describing a brake control device SC including a step determination device DH for a vehicle according to the present disclosure.

The brake control device SC including the step determination device DH according to the present disclosure will be described with reference to FIG. 1. The brake control device SC has the two systems of fluid passages. The first system, which relates to a first master cylinder chamber Rm1, connects to the wheel cylinder CWi of the right front wheel WHi. The first system connects to the wheel cylinder CW1 of the left rear wheel WH1. The second system, which relates to a second master cylinder chamber Rm2, connects to the wheel cylinder CWj of the left front wheel WHj. The second system connects to the wheel cylinder CWk of the right rear wheel WHk. That is, "a diagonal type", which is also referred to as X type, is used for the two systems of fluid passages. The fluid passages of the two systems may be a front-rear type, which is also referred to as type II. In this case, the wheel cylinders CWi and CWj of the front wheels are connected to the first system, and the wheel cylinders CWk and CW1 of the rear wheels are connected to the second system, respectively.

The vehicle equipped with the brake control device SC includes a braking operation member BP, a wheel cylinder CW, a master reservoir RV, a master cylinder CM, and a brake booster BB. The master cylinder CM is connected to the wheel cylinder CW with a master cylinder fluid passage HM and a wheel cylinder fluid passage HW.

The braking operation member BP, such as a brake pedal, is operated by a driver to decelerate the vehicle. The operation of the braking operation member BP adjusts a braking torque Tq of the wheel WH, and causes the braking force of the wheel WH.

A rotating member KT, such as a brake disc, is fixed to each wheel WH of the vehicle. A brake caliper is arranged so as to sandwich the rotating member KT. The brake caliper has the wheel cylinder CW. As the pressure (or the braking hydraulic pressure) Pw of the braking fluid BF in the wheel cylinder CW is increased, the friction member (e.g., the brake pad) is pressed against the rotating member KT. Since the rotating member KT and the wheel WH are fixed to rotate integrally, a braking torque Tq is generated at the wheel WH by the frictional force generated at this time. The braking torque Tq causes a deceleration slip on the wheel WH, and as a result, a braking force is generated.

The master reservoir (or the atmospheric pressure reservoir) RV is a tank for the working liquid, and the braking fluid BF is stored inside. The master cylinder CM is mechanically connected to the braking operation member BP with a brake rod, a clevis (or a U-shaped link) and the like. The master cylinder CM is a tandem type, and its interior is divided into first and second master cylinder chambers Rm1 and Rm2 by first and second master pistons PL1 and PL2. When the braking operation member BP is not operated, the first and second master cylinder chambers Rm1, Rm2 of the master cylinder CM and the master reservoir RV are in a communicating state. The first and second master cylinder fluid passages HM1 and HM2 are connected to the master cylinder CM.

When the braking operation member BP is operated, the first and second master pistons PL1, PL2 in the master cylinder CM are pushed, and the first and second master pistons PL1, PL2 move forward. This forward movement causes the first and second master cylinder chambers Rm1 and Rm2 to be shut off from the reservoir RV. When the operation of the braking operation member BP is increased, the volumes of the master cylinder chambers Rm1 and Rm2 decrease, and the braking fluid BF is fed from the master cylinder CM toward the wheel cylinder CW through the first and second master cylinder fluid passages HM1, HM2.

The operation force Fp of the braking operation member BP by the driver is reduced by the brake booster (or the booster) BB. A vacuum booster BB is used. The negative pressure is generated by an engine or an electric negative pressure pump. A booster BB can be used an electric motor as a drive source (e.g., an electric booster, an accumulator type hydraulic booster).

The vehicle includes a wheel speed sensor VW, a steering angle sensor SA, a yaw rate sensor YR, a longitudinal acceleration sensor (or a longitudinal deceleration sensor) GX, a lateral acceleration sensor GY, and a braking operation amount sensor BA.

Each wheel WH of the vehicle has a wheel speed sensor VW to detect the wheel speed Vw. The signal of the wheel speed Vw is used for independent control of each wheel such as anti-skid control for suppressing the lock tendency of the wheel WH (i.e., excessive deceleration slip).

A steering operation member (e.g., a steering wheel) has a steering angle sensor SA to detect a steering angle Sa. The vehicle body of the vehicle includes a yaw rate sensor YR to detect a yaw rate (or a yaw angular velocity) Yr. Furthermore, the longitudinal acceleration sensor GX and the lateral acceleration sensor GY are provided to detect the acceleration (or the longitudinal deceleration) Gx in the longitudinal direction (or the advancing direction) of the vehicle and the acceleration (or the lateral acceleration) Gy in the lateral direction (or the direction perpendicular to the advancing direction). Signals from these sensors are used for vehicle motion control such as vehicle stabilization control (ESC) for suppressing excessive oversteer behavior and understeer behavior.

The braking operation amount sensor BA is provided to detect an operation amount Ba of the braking operation member BP (e.g., the brake pedal) by the driver. As the braking operation amount sensor BA, the first and second master cylinder hydraulic pressure sensors PM1 and PM2 are provided to detect the hydraulic pressures (or the first and second master cylinder hydraulic pressures) Pm1 and Pm2 in the master cylinder CM. Furthermore, as the braking operation amount sensor BA, an operation displacement sensor SP for detecting an operation displacement Sp of the braking operation member BP and an operation force sensor FP for detecting an operation force Fp of the braking operation member BP are provided. That is, at least one of the first and second master cylinder hydraulic pressure sensors PM1 and PM2, the operation displacement sensor SP, and the operation force sensor FP is used as the operation amount sensor BA. That is, at least one of the first and second master cylinder hydraulic pressures Pm1 and Pm2, the operation displacement Sp, and the operation force Fp is detected as the braking operation amount Ba. Since "Pm1=Pm2", one of the first and second master cylinder hydraulic pressure sensors PM1 and PM2 can be omitted.

The wheel speed Vw, the steering angle Sa, the yaw rate Yr, the longitudinal acceleration (or the vehicle body deceleration) Gx, the lateral acceleration Gy, and the braking operation amount Ba detected by each sensor (e.g., the wheel speed sensor VW) are input to a controller ECU. The controller ECU calculates the vehicle body speed Vx by using the wheel speed Vw.

{Electronic Control Unit ECU}

The brake control device SC includes the controller ECU and a fluid unit HU. A controller (or the electronic control unit) ECU is configured by an electric circuit substrate on which a microprocessor MP or the like is mounted and a control algorithm programmed in the microprocessor MP. The controller ECU is connected to another controller through an in-vehicle communication bus BS to share signals (e.g., the detected values, calculated values, etc.) with a network.

The controller (or the electronic control unit) ECU controls the electric motor ML of the fluid unit HU and three different types of solenoid valves UP, VI, and VO. Drive signals Up, Vi, and Vo for controlling the various solenoid valves UP, VI, and VO are specifically calculated based on the control algorithm in the microprocessor MP. A drive signal Ml for controlling the electric motor ML is calculated in the same way as above.

The controller ECU has a drive circuit DR for driving the solenoid valves UP, VI, VO, and the electric motor ML. In the drive circuit DR, a bridge circuit is formed by switching elements (or power semiconductor devices such as MOS-FET and IGBT) to drive the electric motor ML. The motor drive signal Ml controls the energization state of each switching element and the output of the electric motor ML. Thus, in the drive circuit DR, the energization state of the solenoid valves UP, VI, and VO, or the excited state of that, is controlled by the switching element in response to the drive signals Up, Vi, and Vo to drive the solenoid valves UP, VI, and VO.

A braking operation amount Ba (=Pm or Sp or Fp), a wheel speed Vw, a yaw rate Yr, a steering angle Sa, the longitudinal acceleration (or the wheel deceleration) Gx, and the lateral acceleration Gy are input to the controller ECU. For example, in the controller ECU, anti-skid control is executed by using the wheel speed Vw to suppress excessive deceleration slip of the wheel WH (e.g., wheel lock). In the controller ECU, vehicle stabilization control (ESC) for suppressing unstable behavior (e.g., excessive oversteer behavior, understeer behavior) of the vehicle is executed by using the actual yaw rate Yr or the like.

{Fluid Unit HU}

The fluid unit HU is connected to the first and second master cylinder fluid passages HM1 and HM2. At parts Bw1 and Bw2 in the fluid unit HU, the master cylinder fluid passages HM1 and HM2 are branched into wheel cylinder fluid passages HWi to HWl and connected to the wheel cylinders CWi to CWl. Thus, the first master cylinder fluid passage HM1 is branched into the wheel cylinder fluid passages HWi and HWl at a first branch part Bw1. The wheel cylinders CWi and CWl are connected to the wheel cylinder fluid passages HWi and HWl. The second master cylinder fluid passage HM2 is branched into the wheel cylinder fluid passages HWj and HWk at the second branch part Bw2 in the same way as above. The wheel cylinders CWj, CWk are connected to the wheel cylinder fluid passages HWj, HWk.

The fluid unit HU includes an electric pump DL, a low-pressure reservoir RL, a pressure adjusting valve UP, a master cylinder hydraulic pressure sensor PM, an inlet valve VI, and an outlet valve VO.

The electric pump DL includes one electric motor ML and two fluid pumps QL1 and QL2. The electric motor ML is controlled in response to the drive signal Ml from the controller ECU. The first and second fluid pumps QL1 and QL2 are integrally rotated by the electric motor ML. The braking fluid BF is pumped up by the first and second fluid pumps QL1 and QL2 from first and second suction parts Bs1 and Bs2 located upper portion of the first and second pressure adjusting valves UP1 and UP2. The pumped braking fluid BF is discharged to first and second discharge parts Bt1 and Bt2 located lower portion of the first and second pressure adjusting valves UP1 and UP2. The first and second low-pressure reservoirs RL1, RL2 are provided on the suction sides of the first and second fluid pumps QL1, QL2.

The first and second pressure adjusting valves UP1 and UP2 are provided in the first and second master cylinder fluid passages HM1 and HM2. A linear type solenoid valve (or a proportional valve or differential pressure valve), in which a valve opening amount (or a lift amount) is continuously controlled in response to the energization state (e.g., the supply current), is used as the pressure adjusting valve UP. The pressure adjusting valve UP is controlled by the controller ECU in response to the drive signal Up. Thus, normally-open type solenoid valves are used as the first and second pressure adjusting valves UP1 and UP2. The first and second master cylinder hydraulic pressure sensors PM1, PM2 are provided upper portion of the pressure adjusting valve UP to detect the first and second master cylinder hydraulic pressures Pm1, Pm2.

The master cylinder fluid passage HM is branched (or divided) into the wheel cylinder fluid passage HW of each front wheel at a part Bw lower portion of the pressure adjusting valve UP. Then inlet valve VI and the outlet valve VO are provided in the wheel cylinder fluid passage HW. A normally-open type on or off electromagnetic valve is used as the inlet valve VI. In addition, a normally-closed type on or off solenoid valve is used as the outlet valve VO. Here, the on or off solenoid valve is a two-port two-position switching type electromagnetic valve having two positions, an open position and a closed position. The solenoid valves VI and VO are controlled in response to the drive signals Vi and Vo by the controller ECU. The braking hydraulic pressure Pw of each wheel can be independently controlled by the inlet valve VI and the outlet valve VO.

The configuration of the inlet valve VI and the outlet valve VO connected to each wheel WH is the same. The normally-open type inlet valve VI is provided in the wheel cylinder fluid passage HW, which is a fluid passage connecting the part Bw and the wheel cylinder CW. The wheel cylinder fluid passage HW is connected to the low-pressure reservoir RL through the normally-closed type outlet valve VO at a lower portion part of the inlet valve VI. For example, in the independent control of each wheel (e.g., the anti-skid control, the vehicle stabilization control, etc.), the inlet valve VI is at the closed position and the outlet valve VO is at the open position to reduce the hydraulic pressure (or the braking hydraulic pressure) Pw in the wheel cylinder CW. The inflow of the braking fluid BF from the inlet valve VI is inhibited, the braking fluid BF in the wheel cylinder CW flows into the low-pressure reservoir RL, and the braking hydraulic pressure Pw is reduced. Furthermore, the inlet valve VI is in the open position and the outlet valve VO is in the closed position to increase the braking hydraulic pressure Pw. The outflow of the braking fluid BF to the low-pressure reservoir RL is inhibited, the braking fluid BF at the adjusted hydraulic pressure Pp (or hydraulic pressure at the lower portion of the pressure adjusting valve UP) adjusted by the pressure adjusting valve UP flows into the wheel cylinder CW, and the braking hydraulic pressure Pw is increased.

The braking torque Tq of the wheel WH is increased/reduced (or adjusted) by increasing/reducing the braking hydraulic pressure Pw. When the braking hydraulic pressure Pw is increased, the force with which the friction material is pressed against the rotating member KT is increased, and the braking torque Tq is increased. As a result, the braking force of the wheel WH is increased. On the other hand, when the braking hydraulic pressure Pw is reduced, the pressing force of the friction material with respect to the rotating member KT is decreased, and the braking torque Tq is reduced. As a result, the braking force of the wheel WH is decreased.

{Processing by Step Determination Device DH}

Figure 2:
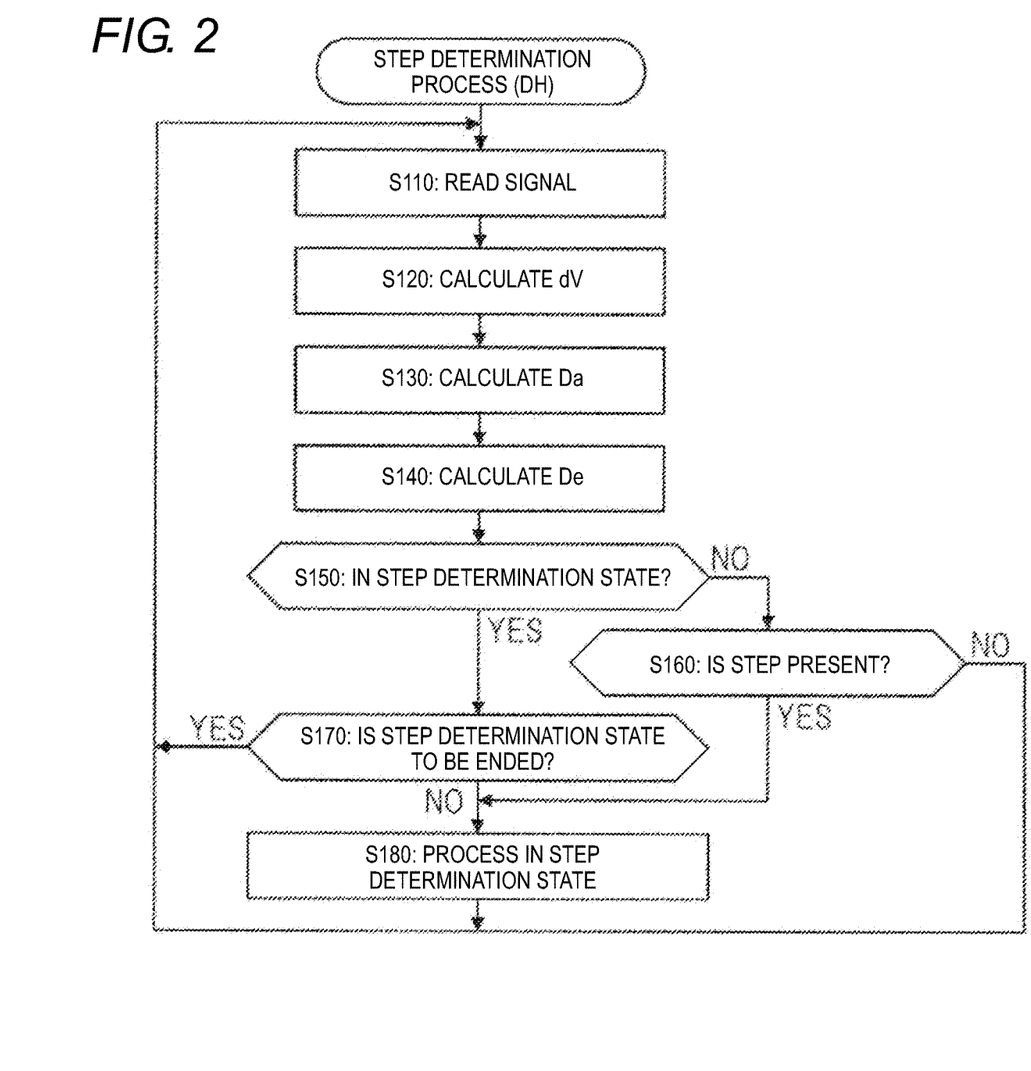
FIG. 2 is a flowchart for explaining processing by the step determination device DH.

The processing by the step determination device DH is described with reference to the flowchart of FIG. 2. This step determination process is programmed in the microprocessor MP of the controller ECU.

In step S110, signals, which is detected values of various sensors and calculated values by the controller ECU, are inputted. Specifically, the wheel speed Vw, the braking operation amount Ba, and the longitudinal acceleration (or the longitudinal deceleration) Gx are inputted. This operation amount Ba of the braking operation member BP is a general term for the master cylinder hydraulic pressure Pm, the operation displacement Sp, and the operation force Fp, and is a signal (or a state quantity) determined from at least one of these.

Furthermore, in step S110, the vehicle body speed Vx calculated by using the wheel speed Vw is read.

In step S120, the wheel deceleration dV is calculated by using the wheel speed Vw. Specifically, the wheel speed Vw is time-differentiated to determine the wheel deceleration dV.

In step S130, an actual variable amount Da is calculated by using the wheel deceleration dV. The actual variable amount Da is a state quantity (or a state variable) representing the change in the wheel speed Vw or the wheel deceleration dV generated by the step on the traveling road surface of the vehicle. Therefore, the controller ECU determines by using the actual variable amount Da whether the vehicle has passed over the road surface step. The actual variable amount Da can be a change gradient of the wheel deceleration dW, which is the amount of a change per unit time of the wheel deceleration dV, obtained by time-differentiating the wheel deceleration dV. That is, the change gradient dW (=Da) of the wheel deceleration is a second order differential value of the wheel speed Vw with respect to time. Furthermore, the peak value (or the maximum value) Dp of the wheel deceleration dV may be used as the actual variable amount Da. The maximum value Dp is determined based on a comparison result between the wheel deceleration dV(n−1) in the previous calculation cycle "n−1" and the wheel deceleration dV(n) in the current calculation cycle "n". Here, the "n−1" and "n" represent the calculation timing in the determination process.

In step S140, an estimated variable amount De is calculated by using the operation amount Ba. Specifically, the operation amount Ba is time-differentiated in correspondence with the change gradient dW of the wheel deceleration, which is one of the actual variable amounts Da, the operation speed dB (or the amount of change per unit time of the operation amount Ba) is calculated, the operation speed dB is multiplied by a predetermined coefficient (or a conversion coefficient), and the estimated variable amount De is calculated. The braking hydraulic pressure Pw dependent on the operation amount Ba is generated and the braking force is generated at the wheel WH. As a result, deceleration Gx of the vehicle is generated. That is, the operation amount Ba relates to the wheel deceleration dV, and the operation speed dB (or differential value of the operation amount Ba) relates to the change gradient dW (or differential value of the wheel deceleration dV). The relationship between the operation amount Ba and the wheel deceleration dV, and the relationship between the operation speed dB and the change gradient dW can be converted between each other by a known relationship based on the specifications of the braking device. Therefore, the estimated variable amounts De corresponding to the actual variable amount Da can be estimated from the operation amount Ba. This specifications of the braking device can be the pressure receiving area of the master cylinder CM, the pressure receiving area of the wheel cylinder CW, the effective braking radius of the rotating member KT, the frictional coefficient of the friction material, the lever ratio of the braking operation member BP, the inertia moment of the wheel WH.

In step S140, when the maximum value Dp is used as the actual variable amount Da, the peak value (or the maximum value) Bp of the operation amount Ba is calculated, and the estimated variable amount De is determined by using the maximum value Bp. Similar way to determine the maximum value Dp, the maximum value Bp is determined by using the comparison result between the previous operation amount Ba(n−1) and the current operation amount Ba(n).

In step S140, the phase difference between the actual variable amount Da and the estimated variable amount De is compensated. For example, during the sudden operation of the braking operation member BP, the state quantity changes dynamically (or transiently) in the order of Ba, Pm, Pw, and Vw. In other words, the estimated variable amount De calculated by using the operation amount Ba is an early signal, and the actual variable amount Da calculated by using the wheel speed Vw is a signal as a result of the operation amount Ba. The dynamic characteristics of each state quantity are known. Thus, a time delay (or a phase difference) Th is considered in the calculation of the estimated variable amount De so that the phases of the actual variable amount Da and the estimated variable amount De match. In this phase compensation, the estimated variable amount De is delayed by time Th.

In step S150, the controller ECU determines by using a determination flag Dh whether it is in the step determination state (i.e., whether the presence or absence of the road surface step is already determined). The determination flag Dh is the result of the determination process described as follows. "Dh=0" indicates the absence of the road surface step on the traveling road surface. Furthermore, "Dh=1" indicates the presence of the road surface step. When the presence or absence of the road surface step has not been determined, or it is not in the step determination state in step S150, the process proceeds to step S160. When the presence or absence of the road surface step has been determined and the presence of the road surface step is determined in step S160, the process proceeds to step S170.

{Start Condition for Road Surface Step Determination}

In step S160, the controller ECU determines the actual variable amount Da and the estimated variable amount De by using whether road surface step is present on the traveling road surface of the vehicle (i.e., the presence or absence of a road surface step is determined. First, in step S160, the deviation hD between the actual variable amount Da and the estimated variable amount De (i.e., the comparison result between the actual variable amount Da and the estimated variable amount De) is calculated (i.e., hD=Da−De). For instance, the component De generated by the operation amount Ba is subtracted from the actual variable amount Da, and the component caused only by the road surface step is extracted. Then, when the change deviation hD is greater than or equal to a predetermined value hx, the presence of the road surface step is determined. In this case, the process proceeds to step S180. On the other hand, when the change deviation hD is less than the predetermined value hx, the absence of the road surface step is determined and the process returns to step S110. Here, the predetermined value hx is a preset constant and is a threshold value for determining the presence or absence of a road surface step.

In step S160, the determination threshold value Dx is determined by using the estimated variable amount De. The determination threshold value Dx is a threshold value for determining the presence or absence of a road surface step, and is a state variable that corresponds to the estimated variable amount De. Specifically, the determination threshold value Dx calculated by referring a preset calculation map is larger as the estimated variable amount De is larger. Then, when the actual variable amount Da is greater than or equal to the determination threshold value Dx, the presence of the road surface step is determined, and the process proceeds to step S180. On the other hand, when the actual variable amount Da is less than the determination threshold value Dx, the absence of the road surface step is determined and the process returns to step S110.

The wheel deceleration dV can be larger as the road surface frictional coefficient μ is smaller. For instance, the wheel WH tends to easily slip, the larger the frictional coefficient μ. As described follows, after it is determined the vehicle in the road surface step state (or the presence of the road surface step state), the control start threshold value is modified so that the anti-skid control is less likely to be activated. However, the anti-skid control may need to execute the anti-skid control when the vehicle travels on a road surface having a low frictional coefficient μ. Accordingly, the following permission condition can be considered. This is the condition to start the road surface step determination by using the comparison result (or deviation) hD between the actual variable amount Da and the estimated variable amount De.

In the permission condition, the controller determines whether the vehicle body deceleration Ga is less than a second predetermined deceleration gx. This second predetermined deceleration gx is a predetermined value, which is a constant. The vehicle can move from a road surface with a low frictional coefficient μ to a road surface with a high frictional coefficient μ. For this case a condition of Ga is less than gx is added as the permission condition in step S160 to be affirmed. In other words, when Ga is not less than gx, the step determination is prohibited. The vehicle body deceleration Ga is calculated by using the vehicle body speed Vx by time-differentiating the vehicle body speed Vx. Furthermore, the detected value Gx from the longitudinal deceleration sensor GX may be determined as the vehicle body deceleration Ga. That is, the vehicle body deceleration Ga is calculated by using at least one of the time differential value, which is a calculated value, of the vehicle body speed Vx and the longitudinal deceleration Gx, which is a detected value.

In step S160, when the presence of the road surface step is determined, the determination flag Dh is "1", which is the determination result. On the other hand, when the presence of the road surface step is denied, the determination flag Dh is "0". Furthermore, in step S160, the calculation of the duration (or determination duration) Td of the step determination state is started from the calculation cycle, which is the start time point of the road surface step state, in which "there is a step" is determined for the first time in the step determination state. That is, at the time point when step S160 is affirmed after step S150 is denied and the determination result (or determination flag) Dh is switched from "Dh=0" to "Dh=1" (corresponding calculation cycle), the count of the determination duration Td is started.

In step S170, the controller ECU determines whether the step determination state is to be ended. Specifically, the step determination is ended at a time point (or the calculation cycle) when one of the following three ending conditions is satisfied. If the ending of the step determination state is denied, the process proceeds to step S180. On the other hand, if the ending of the step determination state is affirmed, the process returns to step S110. When the step determination is ended, the determination result Dh is switched from "Dh=1" to "Dh=0".

In the ending condition 1, the controller ECU determines whether the determination duration Td is greater than or equal to the second predetermined time td. When the duration Td is less than the second predetermined time td, the step determination is continued. On the other hand, when the duration Td is greater than or equal to the second predetermined time td, the step determination is ended (or canceled). Here, the second predetermined time td is a preset constant (or predetermined value) that is a threshold value for determining the ending of the road surface step state. The load reduction of the wheel WH due to the road surface step does not last for a long time, and change of the wheel deceleration dV attenuates after a while. Therefore, the step determination is ended at a time point (or the calculation cycle) when Td is not less than td.

In the ending condition 2, the controller ECU determines whether a state in which the wheel deceleration dV is greater than or equal to a first predetermined deceleration dx has continued for greater than or equal to a first predetermined time tx. Here, the first predetermined deceleration dx and the first predetermined time tx are predetermined values, which are constants. If the wheel slip continues, the step determination is ended. That is, the step determination is canceled when the duration (or the slip duration) Tx when dV is not less than dx is greater than or equal to the first predetermined time tx.

In the ending condition 3, the controller determines whether the vehicle body deceleration Ga is greater than or equal to a second predetermined deceleration gx. Here, the second predetermined deceleration gx is a predetermined value, which is constant. The step determination is canceled when Ga is not less than gx. Similar to the above, the vehicle body deceleration Ga is calculated by using at least one of the time differential value of the vehicle body speed Vx, which is a calculated value, and the longitudinal deceleration Gx, which is a detected value.

In step S180, the start threshold value of the anti-skid control is modified so that the control is less likely to be activated. In the anti-skid control, the control start threshold value is predetermined for activating the control. For example, this start threshold value is determined in correspondence with the interrelationship of "wheel deceleration dV and wheel slip Sw". When the presence of the road surface step state (the state with a step) is determined, the start threshold value related to the wheel deceleration dV is modified to a large value so that the anti-skid control is less likely to be activated. That is, when the vehicle passes over the road surface step, the anti-skid control is not activated even if the wheel deceleration dV is increased to some extent. Consequently, the activation of anti-skid control due to the presence of the step can be avoided. This may reduce the driver's discomfort.

{Variable State Quantities Da, De}

The variable state quantities Da and De is described with reference to the time series diagram of FIG. 3. These variable state quantities Da and De are state quantities (or the state variables) for representing the change of at least one of the wheel speed Vw and the wheel deceleration dV. The actual variable amount Da is calculated by using the wheel speed Vw. The estimated variable amount De is estimated and calculated as the same physical quantity to correspond to the actual variable amount Da by using the operation amount Ba.

The actual variable amount Da will be described with reference to FIG. 3A. The actual variable amount Da is a state variable that expresses the change of at least one of the wheel speed Vw and the wheel deceleration dV that are actually occurring, and is calculated according to the wheel speed Vw. In this case, the operation amount Ba is maintained at a constant value ba, and a constant braking torque Tq is applied to the wheel WH. Furthermore, there is a road surface step in the advancing direction of the vehicle, and the change in the wheel deceleration dV that occurs when the vehicle passes over the step. In FIG. 3A, the positive sign (+) of the wheel deceleration dV is the direction in which the wheel speed Vw decreases, and the negative sign (−) is the direction in which the wheel speed Vw increases.

Figure 3A:
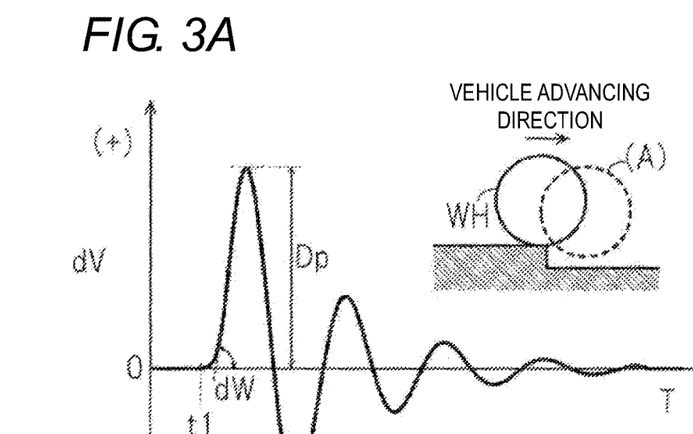
FIGS. 3A and 3B are a time series diagram for explaining variable state quantities Da and De.

The vehicle travels in the direction of the arrow in FIG. 3A, and the wheel WH passes over the road surface step at time point t1. In this case, as shown with the broken line state (A), the wheel WH floats in the air for a moment and the vertical load decreases sharply. At this time, the wheel deceleration dV increases sharply because the road surface reaction force does not act on the wheel WH. Thereafter, when the wheel WH touches the road surface, the vertical load increases and the wheel deceleration dV decreases sharply. The wheel deceleration dV changes according to the change of the ground load of the wheel WH, but the change gradually attenuates.

The actual variable amount Da is calculated by using the wheel speed Vw. For example, the slope (or the time change amount) dW of the wheel deceleration dV is calculated as the actual variable amount Da. That is, the change gradient dW of the wheel deceleration in which the wheel speed Vw is second-order differentiated with respect to time is determined as the actual variable amount Da. Furthermore, the maximum value (or the peak value) Dp of the wheel deceleration dV is used as the actual variable amount Da. For the maximum value Dp, the previous value dV(n−1) and the current value dV(n) for the wheel deceleration dV are compared for every calculation cycle, and the current value dV(n) is stored when the current value dV(n) is greater than or equal to the previous value dV(n−1). Then, at a time point (or the calculation cycle) when the current value dV(n) is less than the previous value dV(n−1), the previous value dV(n−1) is determined as the maximum value Dp.

The estimated variable amount De is described with reference to FIG. 3B. The estimated variable amount De is a state variable that represents the change of at least one of the wheel speed Vw and the wheel deceleration dV corresponding to the actual variable amount Da. Consequently, the estimated variable amount De and the estimated variable amount De have the same physical quantity. The braking hydraulic pressure Pw corresponding to the operation amount Ba is generated, the braking torque Tq is applied to the wheel WH, and the wheel speed Vw and the wheel deceleration dV change. The estimated variable amount De is estimated (or predicted) and calculated from the operation amount Ba. The wheel deceleration dV specifically is converted and calculated from the operation amount Ba by using the specifications of the braking device. Additionally, the wheel deceleration change gradient dW is converted and calculated from the operation speed dB by using the specifications of the braking device. The specifications of the braking device may include the pressure receiving area of the master cylinder CM, the pressure receiving area of the wheel cylinder CW, the effective braking radius of the rotating member KT, the frictional coefficient of the friction material, the lever ratio of the braking operation member BP, and the inertia moment of the wheel WH.

Figure 3B:
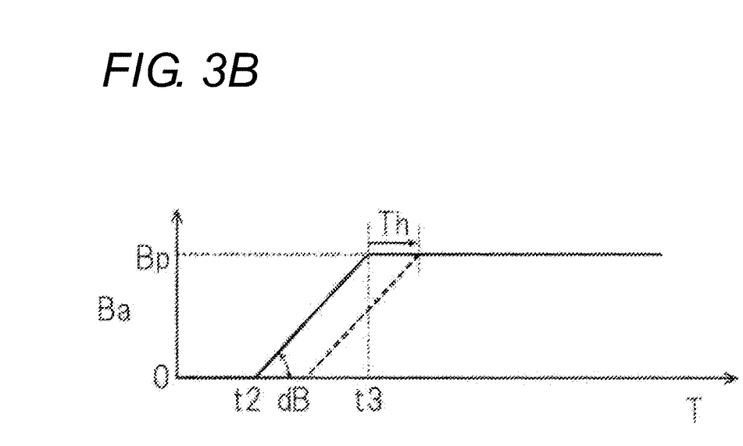

In FIG. 3B, the sudden operation of the braking operation member BP is started at time point t2 and the operation amount Ba is rapidly increased, and the braking operation member BP is held at the value Bp at time point t3. Therefore, the value Bp is the maximum value (or the peak value).

The operation amount Ba is time-differentiated, and the operation speed dB, or the amount of change per unit time of the operation amount Ba is calculated right after time point t2. Then, the operation speed dB is multiplied by the predetermined conversion coefficient described above to calculate the estimated variable amount De corresponding to the change gradient dW of the wheel deceleration. Furthermore, when the maximum value Dp is used as the actual variable amount Da, the estimated variable amount De is determined by using the maximum value Bp and a predetermined conversion operation. For the maximum value Bp of the operation amount Ba, the previous value Ba(n−1) and the current value Ba(n) are compared for every calculation cycle. Then the current value Ba(n) is stored when the current value Ba(n) is greater than or equal to the previous value Ba(n−1). Then, at a time point (or a calculation cycle) when the current value Ba(n) is less than the previous value Ba(n−1), the previous value Ba(n−1) is determined as the maximum value Bp.

In the calculation of the estimated variable amount De, the dynamic characteristics in the transmission path from the operation amount Ba to the wheel deceleration dV are compensated. The wheel deceleration dV transiently has a time delay Th with respect to the operation amount Ba, and a phase difference occurs. Consequently, as shown by the broken line, the estimated variable amount De is delayed by the time Th and compared with the actual variable amount Da so that the phases of the actual variable amount Da and the estimated variable amount De match. The phase time difference Th between the actual variable amount Da and the estimated variable amount De is calculated by a relationship predetermined according to the operation speed dB or the like. The accuracy of road surface step determination is improved by compensating for the phase difference Th.

{Anti-Skid Control Using Determination Result Dh}

Figure 4:
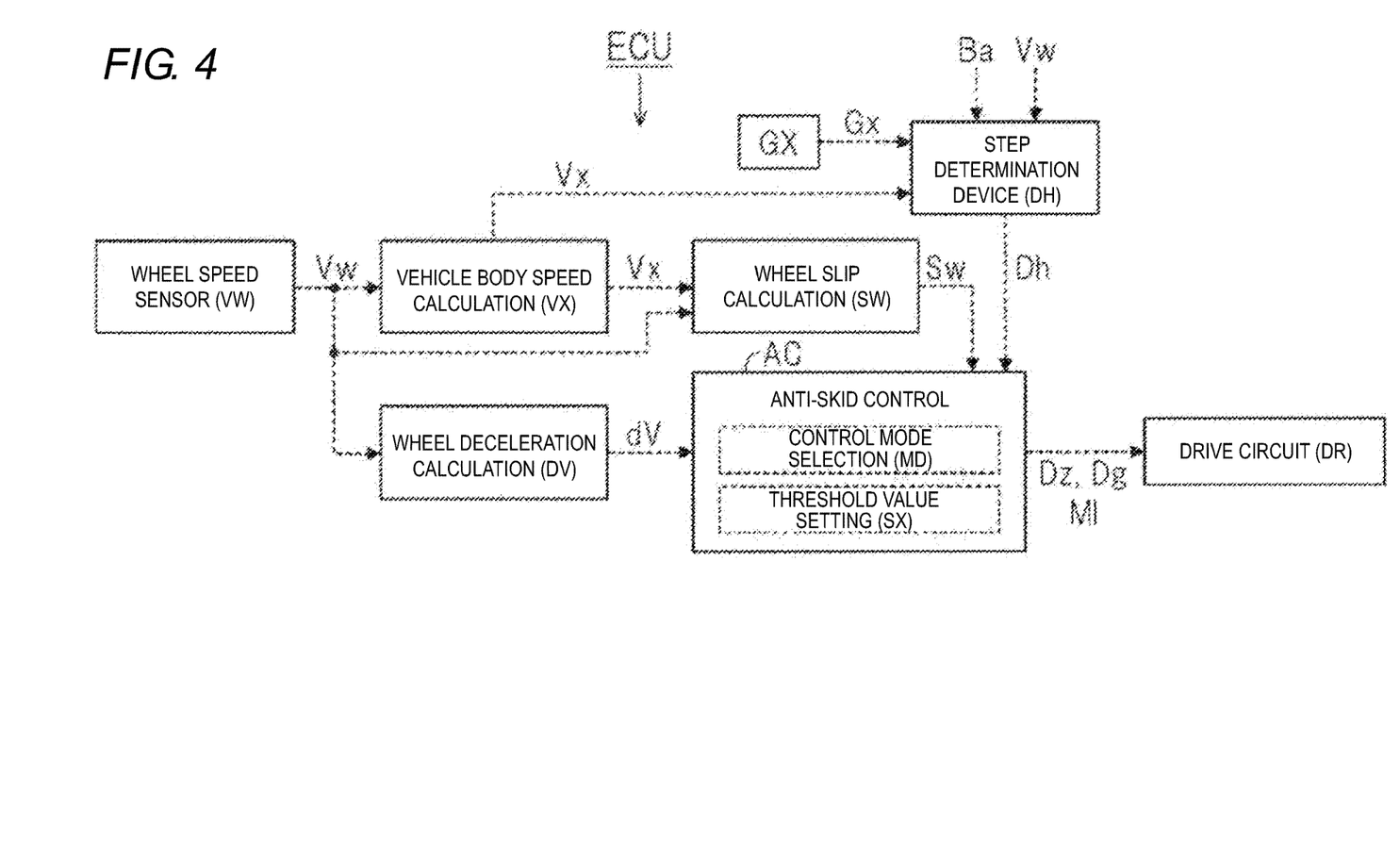
FIG. 4 is a functional block diagram for describing an anti-skid control using the determination result Dh of the step determination device DH.

The anti-skid control using the determination result Dh in the step determination device (or the step determination block) DH is described with reference to the functional block diagram of FIG. 4. The controller ECU is configured to execute the anti-skid control to prevent excessive deceleration slip of the wheel WH. In the anti-skid control, the fluid unit HU, which includes ML, VI, and VO, is controlled and the braking torque Tq of the wheel WH is adjusted.

In the step determination block DH, the presence or absence of a road surface step is determined by using the actual variable amount Da and the estimated variable amount De. The deviation hD (=Da−De) between the actual variable amount Da and the estimated variable amount De may be calculated. When hD is not less than hx, the controller ECU determines the presence of the road surface step. When hD is less than hx, the controller ECU determines the absence of the road surface step. The predetermined value hx is a preset constant. Furthermore, the determination threshold value Dx is determined by using the estimated variable amount De. The controller ECU determines the presence of the road surface step, when Da in not less than Dx. The controller ECU determines the absence of road surface step when Da is less than Dx. The determined value of Dx is larger as the estimated variable amount De is lager. The change in wheel deceleration dV caused by the road surface step may also occur due to the sudden braking operation. The wheel deceleration dV caused by the operation amount Ba is considered as the estimated variable amount De so that the determination accuracy of the road surface step is improved.

In n the step determination block DH, "the vehicle body deceleration Ga is less than the second predetermined deceleration gx" is also added as a permission condition for starting the determination of the road surface step. This second predetermined deceleration gx is a predetermined value (or a constant). Furthermore, the vehicle body deceleration Ga is calculated by using at least one of the time differential value, which is the calculated value, of the vehicle body speed Vx and the longitudinal deceleration, which is the detected value Gx.

In the step determination block DH, the road surface step determination is ended (or canceled) when any of the following three ending conditions is satisfied. The ending condition 1 is specifically that the determination duration Td has reached greater than or equal to the second predetermined time td. The ending condition 2 is that a state in which the wheel deceleration dV is greater than or equal to the first predetermined deceleration dx is continued for greater than or equal to the first predetermined time tx, or the slip duration Tx is greater than or equal to the first predetermined time tx. The ending condition 3 is that the vehicle body deceleration Ga is greater than or equal to a second predetermined deceleration gx. This first predetermined deceleration dx and these first and second predetermined times tx and td are predetermined values, which are constants.

When a vehicle moves a road surface having a low frictional coefficient μ from a road surface having a high frictional coefficient μ, and the like, the permission conditions described above are added and the ending conditions 2, 3 are used in the road surface step determination so that the anti-skid control is reliably executed. In the step determination block DH, the determination flag Dh is output to the anti-skid control block AC, which is described as below, as a determination result on the presence or absence of a road surface step.

Each wheel WH of the vehicle is provided with a wheel speed sensor VW to detect a rotation speed (or a wheel speed) Vw of the wheel WH. The detected wheel speed Vw is input to the controller ECU. The controller ECU includes a vehicle body speed calculation block VX, a wheel deceleration calculation block DV, a wheel slip calculation block SW, an anti-skid control block AC, and a drive circuit DR.

In the vehicle body speed calculation block VX, the vehicle body speed Vx is calculated by using the wheel speed Vw. For example, at the time of non-braking including acceleration of the vehicle, the vehicle body speed Vx is calculated by using the slowest (or the slowest wheel speed) of the four wheel speeds Vw. However, at the time of braking, the vehicle body speed Vx is calculated by using the fastest (or the fastest wheel speed) of the four wheel speeds Vw. Furthermore, in the calculation of the vehicle body speed Vx, the time change amount may be limited. That is, an upper limit value αup of the increase gradient and a lower limit value αdn of the decrease gradient of the vehicle body speed Vx are set, and the change in the vehicle body speed Vx is restricted by the upper and lower limit values αup, αdn.

In the wheel deceleration calculation block DV, the wheel deceleration dV, or the time change amount of the wheel speed Vw, is calculated by using the wheel speed Vw. The wheel speed Vw is specifically time-differentiated to calculate the wheel deceleration dV.

In the wheel slip calculation block SW, a deceleration slip (or a wheel slip) Sw of the wheel WH is calculated by using the vehicle body speed Vx and the wheel speed Vw. The wheel slip Sw is a state quantity representing the degree of grip of the wheel WH with respect to the traveling road surface. For example, a deceleration slip speed, which is the deviation between the vehicle body speed Vx and the wheel speed Vw, hV of the wheel WH (hV=Vx−Vw) is calculated as the wheel slip Sw. Furthermore, a wheel slip ratio (=hV/Vx) in which the slip speed, which is the speed deviation, hV is made dimensionless with the vehicle body speed Vx may be used as the wheel slip Sw.

In the anti-skid control block AC, the anti-skid control is activated and executed by using the wheel deceleration dV and the wheel slip Sw. The controller ECU is in either a pressure reducing mode Mg or a (pressure) increasing mode Mz adjusts the braking hydraulic pressure Pw during the anti-skid control. The (pressure) reducing mode Mg is the mode Mg for reducing the braking torque Tq (i.e., braking hydraulic pressure Pw). The pressure increasing mode Mz is the mode for increasing the braking torque Tq (i.e., braking hydraulic pressure Pw) These reduction mode Mg and the increase mode Mz are generically referred to as control modes and are determined by a mode selecting block MD included in the anti-skid control block AC.

A plurality of threshold values is predetermined in the control mode selecting block MD to determine each control mode. The anti-skid control is activated in response to the interrelationship between these threshold values and the "wheel deceleration dV and wheel slip Sw". First, the reduction mode Mg is executed in the anti-skid control. Furthermore, any one of the reduction mode Mg and the increase mode Mz is selected on the basis of the above interrelationship, and the execution of the anti-skid control is continued.

In addition, the duty ratio Dg of the outlet valve VO and the duty ratio Dz of the inlet valve VI are determined in the control mode selecting block MD. This duty ratio is a ratio of the energization time (or on time) per unit time. Then, the on or off electromagnetic valves VI, VO are driven and the braking hydraulic pressure Pw of the wheel cylinder CW is adjusted on the basis of the selected control mode and the determined duty ratio. In addition, the drive signal Ml of the electric motor ML is calculated to return the braking fluid BF from the low-pressure reservoir RL to the upper portion Bw of the inlet valve VI.

When the reduction mode Mg is selected and the braking hydraulic pressure Pw is reduced in the anti-skid control, the inlet valve VI closes and the outlet valve VO opens. That is, the pressure increasing duty ratio Dz is determined to be 100%, or the valve is normally energized, and the outlet valve VO is driven on the basis of the pressure reducing duty ratio Dg. Subsequently, the braking fluid BF in the wheel cylinder CW flows into the low-pressure reservoir RL, and the braking hydraulic pressure Pw reduces. This pressure reducing speed (or the time gradient in the reduction of the braking hydraulic pressure Pw) is determined by using the duty ratio Dg of the outlet valve VO. One hundred percentage of the pressure reducing duty ratio Dg corresponds to the normally-open state of the outlet valve VO, and the braking hydraulic pressure Pw rapidly reduces. When Dg=zero %, or when the outlet valve VO is in non-energization, the outlet valve VO closes.

The anti-skid control block AC includes a threshold value setting block SX. In the threshold value setting block SX, the control start threshold value of the anti-skid control is modified on the basis of the determination flag Dh from the step determination block DH. When "Dh=0" and the absence of a road surface step is determined, a default value (or an initial value) is set as the control start threshold value in the threshold value setting block SX. When the presence of a road surface step is determined on the basis of "Dh=1", the control start threshold value is modified from the initial value so that the anti-skid control is less likely to be activated in the threshold value setting block SX. For example, the start threshold value related to the wheel deceleration dV is modified to be larger than the initial value. The start threshold value related to the wheel slip Sw is also modified to be larger than the initial value.

When the increase mode Mz is selected and the braking hydraulic pressure Pw increases during the anti-skid control, the inlet valve VI opens and the outlet valve VO closes. That is, the pressure reducing duty ratio Dg is determined to be 0%, and the inlet valve VI is driven on the basis of the pressure increasing duty ratio Dz. The braking fluid BF flows into the wheel cylinder CW, and the braking hydraulic pressure Pw increases. The pressure increasing speed (or the time gradient in increasing the braking hydraulic pressure) is adjusted by the duty ratio Dz of the inlet valve VI 0% of the pressure increasing duty ratio Dz corresponds to the normally-open state of the inlet valve VI, and the braking hydraulic pressure Pw rapidly increases. The inlet valve VI closes when Dz=100%, or when the inlet valve VI is normally energized.

When the braking hydraulic pressure Pw needs to be held during the anti-skid control, the outlet valve VO or the inlet valve VI normally closes in the reduction mode Mg or the increase mode Mz. Specifically, when the braking hydraulic pressure Pw needs to be held in the reduction mode Mg, the duty ratio Dg of the outlet valve VO is determined to be 0%, or the outlet valve VO is in normally-closed state. Furthermore, when the braking hydraulic pressure Pw needs to be held in the increase mode Mz, the duty ratio Dz of the inlet valve VI is determined to be 100%, or the inlet valve VI is in normally-closed state.

In the drive circuit DR, the electromagnetic valves VI, VO and UP, the electric motor ML are driven on the basis of the pressure increasing or reducing duty ratios Dz, Dg and the drive signal Ml. In the drive circuit DR, a drive signal Vi for the inlet valve VI is calculated on the basis of the pressure increasing duty ratio Dz, and a drive signal Vo for the outlet valve VO is determined on the basis of the pressure reducing duty ratio Dg to execute the anti-skid control. Furthermore, the drive signal Ml is calculated to drive the electric motor ML at a predetermined rotation number.

In the drive circuit DR, the energization state of the solenoid valves VI, VO, UP, and the electric motor ML is controlled by the switching element (or the power semiconductor device) on the basis of the drive signals Vi, Vo, Up, and Ml. The solenoid valves VI, VO, UP, and the electric motor ML are thereby driven, and the anti-skid control, and the like are executed.

The invention claimed is:

1. A road surface step determination device comprising:
    an operation amount sensor configured to detect a magnitude of an operation amount of a braking operation member of a vehicle; and
    a controller configured to calculate an actual variable amount by using the wheel speed, and calculate an estimated variable amount corresponding to the actual variable amount by using the magnitude of the operation amount, the calculation of the actual variable amount being different from the calculation of the estimated variable amount, and determine a presence or absence of a step by using the actual variable amount and the estimated variable amount, wherein the actual variable amount and the estimated variable amount correspond to an amount based on the wheel speed which is different from a body speed of the vehicle, and adjust a start threshold value of anti-skid control based on the determined presence or absence of the step, and start the anti-skid control when the start threshold value is met.

2. The road surface step determination device according to claim 1,
    wherein the controller is configured to determine the presence of the step when a difference between the actual variable amount and the estimated variable amount is not less than a predetermined value, and
    to determine the absence of the step when the difference is less than the predetermined value.

3. The road surface step determination device according to claim 1, wherein the controller is configured to
    determine a determination threshold value by using the estimated variable amount, and to
    determine the presence of the step when the actual variable amount is not less than the determination threshold value, and
    determine the absence of the step when the actual variable amount is less than the determination threshold value.

* * * * *